Patented May 11, 1943

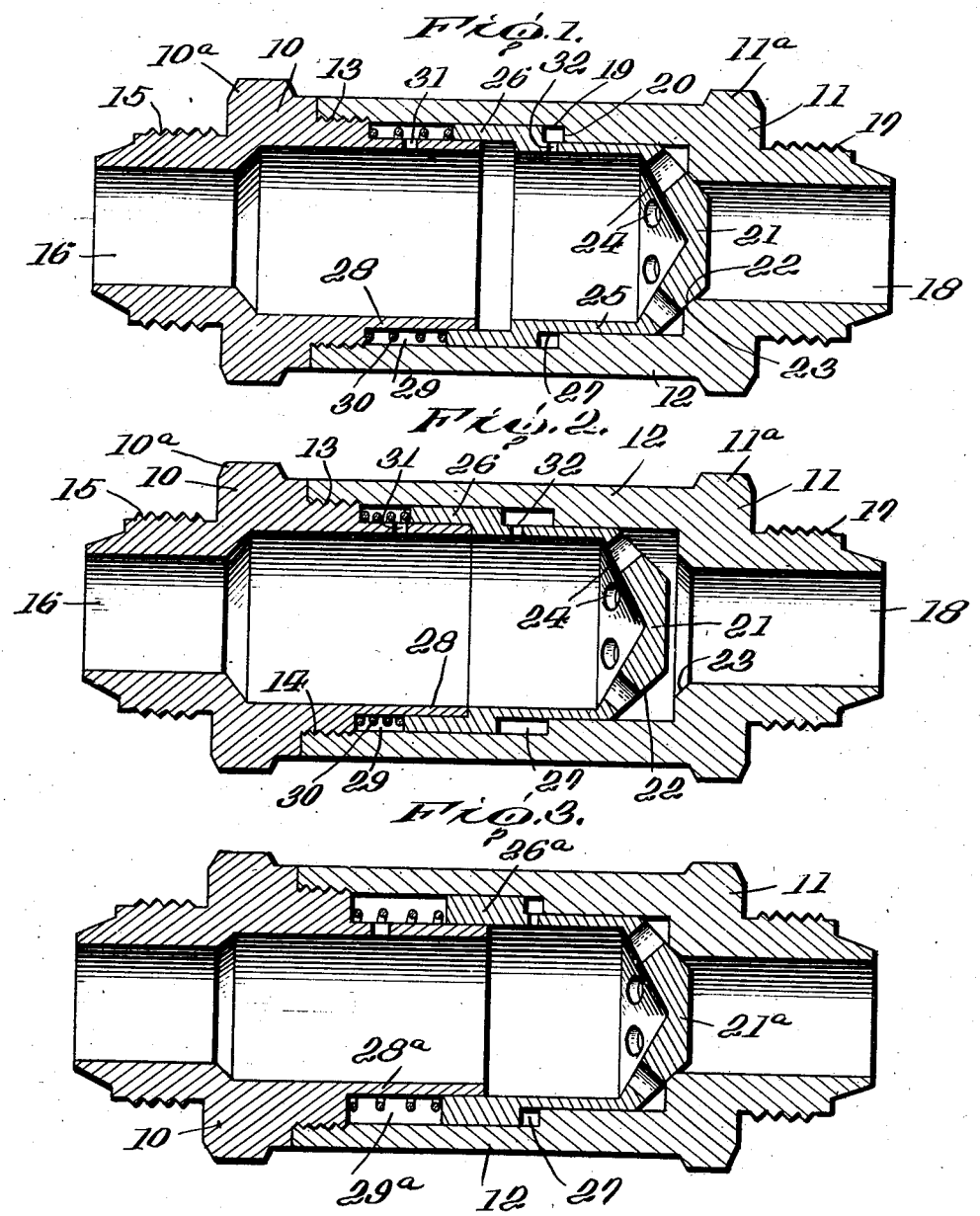

2,318,963

UNITED STATES PATENT OFFICE 2,318,963

VALVE ASSEMBLY

Arthur L. Parker, Cleveland, Ohio

Application November 28, 1940, Serial No. 367,656

5 Claims. (Cl. 251—146)

This application is a continuation-in-part of my copending application Serial No. 350,762, filed August 3, 1940.

The present invention relates to new and useful improvements in a valve assembly for controlling the passage of fluid, and more particularly to improvements in a valve assembly in the form of a check valve for use in hydraulic pressure lines.

In hydraulic pressure systems, it is often desirable to include one or more check valves in the fluid pressure lines. Such a check valve operates to automatically open and close the pressure line in accordance with the pressure differential on opposite sides of the valve. As the pressure varies, the valve is caused to correspondingly move in opposite directions and the present invention contemplates the provision of a check valve assembly wherein chattering or pounding of the valve is prevented. In various installations of hydraulic pressure systems, as for instance in the pressure systems of aircraft or the like, the check valve assembly must necessarily be employed with relatively small tube or pipe lines and it is desirable to construct the valve assembly in such a manner that it can be made in extremely small sizes so that it will not materially increase the external diameter of the relatively small tube or pipe lines and thus conform to weight and size requirements.

An object of the present invention is to provide a valve assembly of the above type wherein chattering or pounding incident to opening and closing movements of the valve, is prevented by positive hydraulic checking or damping of movements of the valve in opposite directions.

Another object of the invention is to provide a valve assembly of the above type wherein the hydraulic checking of opposite movements of the valve is effected by providing cushioning chamber means arranged peripherally around the inner surface of the valve casing so as not to interfere with the free passage of fluid therethrough.

A further object of the invention is to provide a valve assembly of the above type wherein a plurality of cushioning chambers are employed and arranged so that one of the chambers serves to hydraulically check opening movements of the valve while another of the chambers serves to hydraulically check closing movements of the valve.

A still further object of the invention is to provide a valve assembly of the above type wherein each of the cushioning chambers includes a wall portion which is movable in unison with opening and closing movements of the valve so that opposite movements of the valve are positively and hydraulically checked or retarded.

The above and other objects of the invention will in part be obvious and will be hereinafter more fully pointed out.

In the accompanying drawing:

Figure 1 is a longitudinal sectional view of the valve assembly, showing the valve member in a seated position.

Figure 2 is a longitudinal section, similar to Figure 1, but showing the valve member in an open position.

Figure 3 is a longitudinal sectional view of a modified form of valve assembly with the valve member in a seated position.

Referring more in detail to the accompanying drawing, and particularly to Figures 1 and 2, the valve casing is illustrated as including male and female parts 10, 11, respectively. The female casing part 11 includes a sleeve portion 12 which provides a housing for the valve and which has one end thereof internally threaded as at 13, to threadedly receive an externally threaded portion 14 on the male casing part 10. Both the male and female casing parts are provided with wrench engaging portions 10a, 11a, respectively, so that the parts can be tightly secured together. The male casing part is provided with an externally threaded extension 15 to which an outlet or discharge conduit may be secured. The extension is centrally bored to provide a longitudinal discharge passage 16. The female coupling part 11 is provided with an externally threaded extension 17 which is centrally bored to provide a longitudinal inlet passage 18. A suitable supply or inlet conduit is adapted to be secured to the threaded extension 17.

Within the valve casing, the inner surface of the sleeve portion 12 on the female part 11 is outwardly offset, as at 19, to provide an annular shoulder 20. A valve member 21 has an inclined valve surface which is adapted to cooperate with a valve seat 23 on the female part 11. Within the valve surface 22, the valve member is provided with a plurality of apertures 24 which are adapted to permit passage of fluid from the inlet passage 18 to the outlet passage 16 when the valve is unseated, as shown in Figure 2. The valve member is also provided with a cylindrical skirt portion 25 which cooperates with the reduced inner surface of the sleeve portion 12 so as to guide the valve member in a rectilinear path. The valve member is also provided with an extended skirt portion 26 which is outwardly offset with respect to the skirt portion 25 and which cooperates with the offset surface 19 on the sleeve portion 12 and serves to guide the movements of the valve member.

When the valve member is closed, as in Figure 1, there is no communication between the inlet passage 18 and the ports 24 and the offset skirt portion 26 is spaced from the shoulder or wall portion 20 on the sleeve 12 so as to provide a chamber 27. The male casing part 10 is provided with a sleeve portion 28 of reduced thickness and extending beyond the threaded portion 14. The outer surface of the sleeve portion 28 overlaps and snugly fits the inner surface of the offset skirt portion 26 on the valve member. A chamber 29 is thus provided between the threaded portion 14 and the end of the offset skirt portion 26 and it is to be noted that the end of the skirt portion 28 terminates short of the end of the skirt portion 25 so as to permit opening of the valve member. A coil spring 30 is disposed within the chamber 29 and bears against the edge of the threaded portion 14 and the end of the skirt portion 26 and thus tends to normally force the valve member 21 toward a closed or seated position. The skirt portion 28 is provided with a bleed hole 31 therethrough so as to permit fluid in the system to gain access to the chamber 29. Similarly, the skirt portion 25 on the valve member is provided with a bleed hole 32 which permits fluid in the system to gain access to the chamber 27. Thus, both chambers 27, 29 are maintained full of fluid so as to provide a positive hydraulic blocking or checking action in the manner to be hereinafter pointed out, although provision may be made for the fluid to gain access to the chamber by seepage between the relatively moving parts.

The offset skirt portion 26 is movable with the valve member and thus provides a movable dividing wall between the chambers 27, 29. When the valve member is seated in the position shown in Figure 1, the chamber 27 has a relatively small fluid content while the chamber 29 has a relatively large fluid content. When the pressure in the supply or inlet line reaches a degree sufficient to overcome the force of the spring 30 intending to close the valve member, the valve surface 22 will be shifted away from the valve seat 23 to substantially the position shown in Figure 2 so as to permit fluid to pass from the inlet passage 18 through the ports 24 and thence through the outlet passage 16. During this opening movement of the valve member, the movable wall portion 26 will be similarly shifted so that the size of the chamber 27 is increased while the size of the chamber 29 is decreased. Thus, this opening movement of the valve member will be retarded or checked by the hydraulic resistance afforded by the fluid in the chamber 29 since the fluid can only escape through the restricted bleed hole 31. During this same opening movement of the valve member, the enlargement of the chamber 27 will draw in additional fluid through the bleed hole 32 so as to maintain the chamber 27 full of fluid.

When the pressure in the inlet line is reduced or conversely, when the pressure in the discharge line may be increased, the valve member 21 will be moved toward the seated position of Figure 1 and the normal closing action of the spring 30 will assist this movement. During this closing movement of the valve member, the chamber 29 will be increased in size while the chamber 27 will be reduced in size. Thus, the fluid within the chamber 27 will hydraulically check or retard closing movement of the valve and additional fluid will be drawn into the chamber 29 so as to check any further opening movement of the valve.

From the foregoing description, it will be seen that both opening and closing movements of the valve member 21 are hydraulically checked, as distinguished from a checking by vacuum. Thus, pounding of the valve surface 22 on its seat 23 is prevented by the hydraulic dash-pot action of the chamber 27. Similarly, pounding of the end of skirt portion 25 against the end of the skirt portion 28 during opening of the valve member is prevented by the hydraulic dash-pot action of the chamber 29. The sleeve portion 26 on the valve member 21 serves as a movable dividing wall between the chamber 27, 29 so that a positive hydraulic damping or retarding of opposite movements of the valve member is obtained.

In some installations, it may be desired to provide a stronger retarding or dash-pot action to resist opening of the valve member than the closing thereof. In Figure 3 of the accompanying drawing, such an arrangement is shown. The skirt portion 28a on the male coupling part is spaced a greater distance inwardly away from the inner surface of the sleeve portion 12 on the female coupling part so as to provide a larger chamber 29a. With this construction, the sleeve portion 26a on the valve member 21a is increased inwardly in thickness so as to snugly fit around the inner surface of the skirt portion 28a. Thus, the chamber 29a is very much larger than the chamber 27 so that a greater hydraulic checking of the opening movement of the valve member 21a is obtained. Of course, in some installations, a stronger dash-pot action may be desired for the closing movement of the valve member in which case the relationship of the parts may be altered so that the chamber 27 will be larger than the chamber 29. This unbalanced hydraulic retarding action may also be obtained by altering the relative size of the bleeding holes 31, 32. Thus, if the chambers 27, 29 had the same fluid content, the chamber 29 could be made to have lighter dash-pot action than the chamber 27 by making the bleed hole 31 larger in size than the bleed hole 32, and vice versa.

It is to be clearly understood that various changes in the details of construction and arrangement of parts may be made without departing from the scope of the invention as set forth in the appended claims.

I claim:

1. A check valve assembly for use in fluid pressure lines, comprising a valve casing having inlet and outlet ports, a valve seat disposed within said valve casing, a valve member adapted to cooperate with said valve seat for controlling the passage of fluid through the valve casing, means providing a pair of annular chambers around the inner surface of said valve casing and including a dividing wall between the chambers, said dividing wall being movable with said valve member whereby each chamber varies in size according to movements of the valve member, means providing restricted communication between each chamber and the pressure line for effecting hydraulic checking of opposite movements of the valve member whereby to prevent chattering or pounding of the valve member during opening and closing movements thereof, and said chambers being of different radial sizes whereby to effect differential checking of opposite movements of the valve member.

2. A check valve assembly for use in fluid pressure lines, comprising a valve casing having inlet and outlet ports and a sleeve portion extending within and spaced inwardly of the casing, a valve seat disposed within said casing, a valve member adapted to cooperate with said valve seat for controlling the passage of fluid through the valve casing and having a skirt portion fitting within the valve casing with a portion thereof disposed between said sleeve portion and the inner surface of the valve casing whereby to provide a pair of annular chambers with a movable dividing wall therebetween, said sleeve portion and said skirt portion having restricted openings therethrough for providing restricted communication between the pressure line and the chambers whereby to effect hydraulic checking of opposite movements of the valve member.

3. A check valve assembly comprising a casing having unobstructed passage therethrough and having at the opposite ends thereof projecting portions for pipe connections, each projecting portion having a port leading therethrough to the interior of the casing, said casing including inner and outer sleeves, one within the other, having a threaded connection, said portion carrying the outer sleeve having a valve seat at the inner end of the port through the projecting portion thereon, a valve located in said casing, said valve having a cylindrical skirt making sliding contact with the inner wall of the outer sleeve, said inner sleeve having an integral extension spaced from the outer sleeve and extending into the cylindrical skirt to make sliding contact with the inner wall thereof, a spring disposed within the chamber formed between the inner and outer sleeves and bearing against the skirt of the valve for normally holding said valve closed said sleeve extension having an opening therethrough disposed and dimensioned so as to permit restricted communication between said chamber and the central fluid passage in said casing, said valve having openings therethrough disposed outside of the line of contact between the valve and the valve seat.

4. A check valve assembly comprising a casing having an unobstructed passage therethrough and having at the opposite ends thereof projecting portions for pipe connections, each projecting portion having a port leading therethrough to the interior of the casing, said casing including inner and outer sleeves, one within the other, having a threaded connection, said portion carrying the outer sleeve having a valve seat at the inner end of the port through the projecting portion thereon, a valve located in said casing, said valve having a cylindrical skirt making sliding contact with the inner wall of the outer sleeve, said inner sleeve having an integral extension spaced from the outer sleeve and extending into the cylindrical skirt to make sliding contact with the inner wall thereof, a spring disposed within the chamber formed between the inner and outer sleeves and bearing against the skirt of the valve for normally holding said valve closed, said valve having openings therethrough disposed outside of the line of contact between the valve and the valve seat, and means movable with said valve member and disposed within said valve casing for hydraulically checking movements of the valve member in opposite directions whereby to prevent chattering of the valve during the opening and closing movements thereof.

5. A check valve assembly comprising a casing having at the opposite ends thereof projecting portions for pipe connections, each projecting portion having a port leading therethrough to the interior of the casing, said casing including inner and outer sleeves, one within the other, having a threaded connection, said portion carrying the outer sleeve having a valve seat at the inner end of the port through the projecting portion thereon, a valve located in said casing, said outer sleeve having an outwardly offset portion in the inner wall thereof, said valve having a cylindrical skirt making sliding contact with the inner wall of the outer sleeve, said skirt having an offset portion making contact with the inner wall of the offset portion in the inner wall of said outer sleeve, said inner sleeve having an extension spaced from the outer sleeve and extending into the cylindrical skirt to make sliding contact with the inner wall thereof, a spring disposed within the chamber formed between the inner and outer sleeves and bearing against the skirt of the valve for normally holding the valve closed, said skirt having an opening therethrough leading into the chamber between the valve and the outer sleeve and said inner sleeve having an opening therethrough leading into the chamber containing said spring, said valve having openings therethrough disposed outside of the line of contact between the valve and the valve seat.

ARTHUR L. PARKER.